United States Patent
Herrig et al.

(10) Patent No.: US 12,366,225 B2
(45) Date of Patent: Jul. 22, 2025

(54) WIND TURBINE BLADE WITH DAMPENING OF EDGEWISE VIBRATIONS

(71) Applicant: LM WIND POWER A/S, Kolding (DK)

(72) Inventors: Andreas Herrig, Salzbergen (DE); Benjamin Patrick Hallissy, Schenectady, NY (US)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 18/250,168

(22) PCT Filed: Dec. 22, 2021

(86) PCT No.: PCT/EP2021/087297
§ 371 (c)(1),
(2) Date: Apr. 21, 2023

(87) PCT Pub. No.: WO2022/136547
PCT Pub. Date: Jun. 30, 2022

(65) Prior Publication Data
US 2024/0035438 A1 Feb. 1, 2024

(30) Foreign Application Priority Data
Dec. 22, 2020 (EP) .................................... 20216549

(51) Int. Cl.
*F03D 1/06* (2006.01)

(52) U.S. Cl.
CPC .... *F03D 1/06495* (2023.08); *F05B 2260/964* (2013.01)

(58) Field of Classification Search
None
See application file for complete search history.

(56) References Cited

U.S. PATENT DOCUMENTS

| | | | |
|---|---|---|---|
| 8,157,533 B2 * | 4/2012 | Godsk | F03D 1/0641 416/240 |
| 9,377,005 B2 * | 6/2016 | Yarbrough | F03D 3/061 |

(Continued)

FOREIGN PATENT DOCUMENTS

| | | |
|---|---|---|
| EP | H6-305492 A | 11/1994 |
| EP | 2716906 A2 | 4/2014 |

(Continued)

*Primary Examiner* — Kayla Mccaffrey
(74) *Attorney, Agent, or Firm* — Nath, Goldberg & Meyer; Jerald L. Meyer (57) ABSTRACT

The present disclosure relates to dampening of predominantly edgewise vibrations in a wind turbine blade. This is achieved by a wind turbine blade comprising one or more bump airfoil sections, each bump airfoil section being characterised in that for any airfoil within the bump airfoil section, the airfoil's pressure side profile $y_p$ has particular geometric properties near the trailing edge of the airfoil. Furthermore, a total length of all bump airfoil sections in the blade is at most 30% of the length of the blade, and at least half of the total length of all bump airfoil sections in the wind turbine blade is provided by one or more bump airfoil sections located spanwise in the outermost 30% of the blade.

18 Claims, 9 Drawing Sheets

(56) References Cited

U.S. PATENT DOCUMENTS

| | | | | |
|---|---|---|---|---|
| 10,677,217 B2 * | 6/2020 | Herrig | ............... | F03D 1/0675 |
| 2014/0093380 A1 * | 4/2014 | Drobietz | ............ | F03D 1/0675 |
| | | | | 416/228 |
| 2015/0292522 A1 | 10/2015 | Singh et al. | | |

FOREIGN PATENT DOCUMENTS

| | | | |
|---|---|---|---|
| EP | 2716906 A3 | 4/2014 | |
| EP | 3009669 A1 | 4/2016 | |

* cited by examiner

WIND TURBINE BLADE WITH DAMPENING OF EDGEWISE VIBRATIONS

This is a National Phase Application filed under 35 U.S.C. 371 as a national stage of PCT/EP2021/087297, filed Dec. 22, 2021, an application claiming the benefit of European Application No. 20216549.4, filed Dec. 22, 2020, the content of each of which is hereby incorporated by reference in its entirety.

TECHNICAL FIELD

The present invention relates to vibrations in wind turbine blades.

BACKGROUND OF THE INVENTION

Wind power is increasingly popular due to its clean and environmentally friendly production of energy. The rotor blades of modern wind turbines capture kinetic wind energy by using sophisticated blade design created to maximise efficiency.

Modern wind turbine blades are manufactured with increasingly longer blade lengths, and the longer span of the blades may result in higher relative wind speeds experienced by the blades. This affects a number of performance properties, such as blade noise and blade wear.

Another issue is edgewise vibrations. Such edgewise vibrations (e.g. whirl modes) and other instabilities are exacerbated, because wind turbine blades are also becoming increasingly slender. The instabilities lead to significantly increasing fatigue loads and may reduce turbine life if not mitigated. Edgewise vibrations are illustrated schematically by arrows 90 in FIG. 1.

Attempts to address the issues have for instance included adding stall strips. However, these are noisy. Adding stiffness has also been used, but to be effective, the weight and material cost are increased significantly, and wear on the turbine respectively other component loads increase accordingly. Tailored pre-bending has also been attempted, but with mixed results. Another approach involves modifying the blade tip with an additional external mass, but this involves significant additional weight, and the additional weight increases wear of the turbine. An internal mass damping system, for instance fluid-based liquid dampers, is heavy and relatively ineffective. Another approach is to implement trailing-edge tabs or flaps, but they are not very effective and add significant drag and noise.

Thus, there is an increasing need for wind turbine blades that are tailored to exhibit less edgewise vibration and in turn experience less fatiguing originating from such vibrations.

SUMMARY OF THE INVENTION

The present invention provides wind turbine blades that overcome at least some of the issues described above.

A first aspect of the invention provides a wind turbine blade having a suction side and a pressure side connected at a leading edge of the wind turbine blade and at a trailing edge of the wind turbine blade, the blade extending along a longitudinal axis z from a root end of the wind turbine blade at z=0 to a tip end of the wind turbine blade at z=L, where L is a length of the blade, the blade being characterised in that:

(i) the blade comprises one or more bump airfoil sections, each bump airfoil section being characterised in that for any airfoil within the bump airfoil section, the airfoil's pressure side profile $y_p(x)$ has the following geometric properties near the trailing edge of the airfoil, x being an axis defined by a chord of the airfoil, where the chord has a length c and x=0 coincides with a leading edge of the airfoil and $x_c$=c coincides with a trailing edge of the airfoil:

at a point $x=x_1$, where $x_1 \geq 0.6c$, the pressure side profile $y_p(x)$ has a slope $s_1$ and $y_p(x_1) > y_s(x_1)$, where $y_s(x)$ is a suction side profile of the airfoil, there is a point $x=x_2$, $x_2 > x_1$, where a slope $s_2$ of the pressure side profile $y_p(x)$ is higher than the slope $s_1$ at $x=x_1$, there is a point $x=x_3$, $x_3 > x_2$, where a slope $s_3$ of the pressure side profile $y_p(x)$ is lower than the slope $s_2$ at $x=x_2$, (ii) a total length, $L_B$, of all bump airfoil sections in the blade is at most 30% of the length of the blade, L, and (iii) at least half of the total length of all bump airfoil sections in the blade is located within the range z=0.7L to z=L.

As can be seen from the above, in some embodiments, a "bump airfoil section" in this disclosure is a blade section within which every airfoil has a pressure side profile $y_p(x)$ characterised as in item (i) in the first aspect above.

Embodiments with more than one bump airfoil section comprise separated bump airfoil sections, i.e. bump airfoil sections that are spaced apart in the longitudinal direction by blade sections that do not exhibit the properties of item (i).

Blades in accordance with embodiments of the invention bump have different boundary layer loading conditions in the trailing-edge region, which drives the airfoil's lift behaviour when changing angle of attack of the blade. It has further been recognized that an increased enclosing angle between the pressure side and the suction side at the trailing edge can reduce the slope of the lift coefficient, which in cooperation with the features of the first aspect of the invention (and with the second and the third aspects, described below) can be used to tailor stability characteristics of wind blades in operation. Embodiments of the invention also change the reversed flow behaviour in a way that can address standstill-oscillation issues with the trailing edge facing forward.

The limited chordwise extent of the bump reduces the amount of material, and in turn weight, needed, while retaining most of the camber and lift.

A further advantage of the invention is that the dampening of vibrations is purely passive, allowing it to be provided by retrofitting an add-on to existing blades at very limited extra mass and cost. The reduced lift slope also reduces other aerodynamic loads. This reduction in aerodynamic loads allows increased tip lengths and a larger rotor radius, which can translate into increased turbine productivity (AEP) and capacity factor (CF).

Blades in accordance with aspects of the invention have a reduced aerodynamically effective area in the tip region and are therefore also less susceptible to fatigue and gust loads driven by changing angle of attack, which opens the above-mentioned possibility to grow the rotor total swept area, increasing capacity factor and AEP more than the reduction from tip un-loading.

It is noted that to determine whether a given airfoil has geometric properties as recited in item (i), it merely has to be determined that there exists a first triplet $x_1$, $x_2$, $x_3$ where the airfoil properties in item (i) are fulfilled. It is clear that evidence that it is possible to find, for the same airfoil, a second triplet $x'_1$, $x'_2$, $x'_3$ where the airfoil properties of item (i) are not fulfilled, does not change the fact that the airfoil has the geometric properties recited in item (i), in this case by virtue of the first triplet. It is often the case that some triplets exhibit the geometric properties recited in item (i) while others do not. For an airfoil to not have the geometric properties recited in item (i) altogether, it is required that there does not exist any triplet $x_1$, $x_2$, $x_3$ where the geometric properties recited in item (i) are fulfilled.

In some embodiments, $x_3$ further fulfills $x_3 \leq 0.97c$ in at least a part of the one or more bump airfoil sections. Similar to the description above, this is to be understood such that for a given airfoil there exists a first triplet $x_1$, $x_2$, $x_3$ that in addition to having the properties recited in item (i) above also fulfills that $x_3 \leq 0.97c$. Again, it is clear that evidence that for the same airfoil it is possible to find a second triplet $x'_1$, $x'_2$, $x'_3$ where the properties recited in item (i) are fulfilled, but the additional limitation "$x_3$ further fulfills $x_3 \leq 0.97c$ in at least a part of the one or more bump airfoil sections" is not fulfilled, does not change the fact that the airfoil does have the characteristics set out in item (i) as well as the additional limitation. In practical terms, the fact that the first triplet meets the additional limitation "$x_3$ further fulfills $x_3 \leq 0.97c$ in at least a part of the one or more bump airfoil sections" means that a point where the pressure side profile slope starts to fall ($s_3$ is lower than the slope $s_2$) is located at least 3% of the chord length from the trailing edge. The bump in such embodiments is removed somewhat from the trailing edge. This reduces or eliminates flow separation near the trailing edge, while still dampening edgewise vibrations at least partly.

In some embodiments, $x_3$ further fulfills $x_3 \leq 0.9c$ in at least a part of the one or more bump airfoil sections.

In some embodiments, $x_1 \geq 0.7c$ in at least a part of the one or more bump airfoil sections.

In some embodiments, $x_1$ further fulfills $x_1 \geq 0.8c$ in at least a part of the one or more bump airfoil sections. This characterises a shorter bump, which has been found to cause only a small change in the lift coefficient compared to a similar airfoil without a bump, while still altering the lift coefficient slope as desired.

In some embodiments, $x_2$ further fulfills $x_2 > 0.8c$ in at least a part of the one or more bump airfoil sections. This also characterises a shorter bump, which has been found to cause only a small change in the lift coefficient compared to a similar airfoil without a bump, while still altering the lift coefficient slope as desired.

A pressure side slope less than 0 (in the coordinate system defined in the claimed invention) characterises the tapered aft-part of an airfoil used on many wind blades. Many blades have an airfoil that have a monotonically decreasing thickness after its point of maximum thickness. In case of a "rear-loaded" airfoil designed for medium to high design lift coefficients, for instance a NACA airfoil, the slope of the pressure side may reverse along the chord length. That is, it is first more negative than on an airfoil not having a relatively high camber near the trailing edge, before becoming more positive upstream of the trailing edge. This is due to the 'contracting' thickness distribution having only a small slope being added around the camber line having a larger slope towards the pressure side near the trailing edge. With a bump airfoil, the thickness distribution does not need to be monotonously decreasing towards the trailing edge, but can, most often, have a portion of increase upstream the trailing edge.

The bump can also be provided by retrofitting a bump-like element that, when added to an airfoil, results in a wind turbine blade in accordance with one or more aspects of the invention. That is, the airfoil cooperates with the bump-like element so that the resulting blade has all the characteristics of the invention.

In some embodiments, there is a point $x=x_2$, $x_2 > 0.7c$, where the slope $s_2$ further fulfills $s_2 > -0.05$ in at least a part of the one or more bump airfoil sections. This steepness results in higher vibration dampening. In some embodiments, there is a point $x_2$, $x_2 > 0.7c$, where the slope $s_2$ of the pressure side profile $y_p(x)$ is at least 0.1. In some embodiments, there is a point $x_2$, $x_2 > 0.7c$, where the slope $s_2$ fulfills $s_2 > 0.2$.

In some embodiments, there is a point $x_3$, $x_3 > 0.7c$, where $s_3$ fulfills $s_3 < -0.05$ in at least a part of the one or more bump airfoil sections. In some embodiments, there is a point $x_3$, $x_3 > 0.7c$, where $s_3$ fulfills $s_3 < -0.1$, such as $s_3 < -0.2$, such as $s_3 < -0.5$ in at least a part of the one or more bump airfoil sections. In some embodiments, there is a point $x_3$, $x_3 > 0.8c$, where $s_3$ further fulfills $s_3 < -0.05$ in at least a part of the one or more bump airfoil sections. In some embodiments, there is a point $x_3$, $x_3 > 0.8c$, where $s_3$ fulfills $s_3 < -0.1$, such as $s_3 < -0.2$, such as $s_3 < -0.5$ in at least a part of the one or more bump airfoil sections.

In some embodiments, a highest slope of the pressure side profile $y_p(x)$ within the range $x > 0.7c$ to $x=c$ is in the range $-0.05$ to $0.5$, such as in the range 0 to 0.4, such as in the range 0.15 to 0.4, such as in the range 0.18 to 0.31, and a lowest slope of the pressure side profile $y_p(x)$ within the range $x > 0.7c$ to $x=c$ is in the range $-0.4$ to $0.05$, such as in the range $-0.4$ to 0, such as in the range $-0.4$ to $-0.1$, such as in the range $-0.39$ to $-0.26$. It has been found by the inventors that these combinations of parameter ranges, which include the parameter ranges specified in the first aspect, are surprisingly effective in dampening vibrations by providing reduced lift slope in the tip, reducing aerodynamic loads, which allows increased tip lengths and larger rotor radii, which in turn translate into increased turbine productivity (AEP) and capacity factor (CF). Furthermore, the combinations of these narrow ranges in the present embodiment in fact also make the blade less susceptible to fatigue and gust loads driven by changing angle of attack. All in all, this leads to the possibility to grow the rotor total swept area, increasing capacity factor and AEP more than the reduction resulting from tip un-loading. In fact, all of these advantages were achieved all the while retaining most of the camber and lift of a blade without a bump characterised by the above ranges, which was not expected. In combination with an enclosing angle in the range 10-45 degrees, such as in the range 15-45 degrees, such as in the range 20-42 degrees, such as in the range 25-40 degrees, the blade efficiency contributed by the bump is further enhanced.

Even if the bump is "longer" in the chordwise direction, i.e. where the bump is characterised by the parameters in the narrow ranges above with the point $x=x_1$ in the range $0.6c \geq x_1 \geq 0.5c$, i.e. closer to the leading edge, the advantages above are still obtained, although to a slightly less, but sufficient, degree. If added thickness is skewed to the trailing edge portion and the camber loss in the upstream portion is small, the aerodynamic effects obtained from modifying the trailing edge flow field are enabled.

In some embodiments, a difference between the highest and lowest slope of the pressure side profile $y_p(x)$ within the range $x > 0.7c$ to $x=c$ is in the range 0.3 to 0.8, such as in the range 0.41 to 0.72.

The features above can be combined as desired, for instance to meet blade performance and load requirements while complying with local noise regulations.

Figure 5:
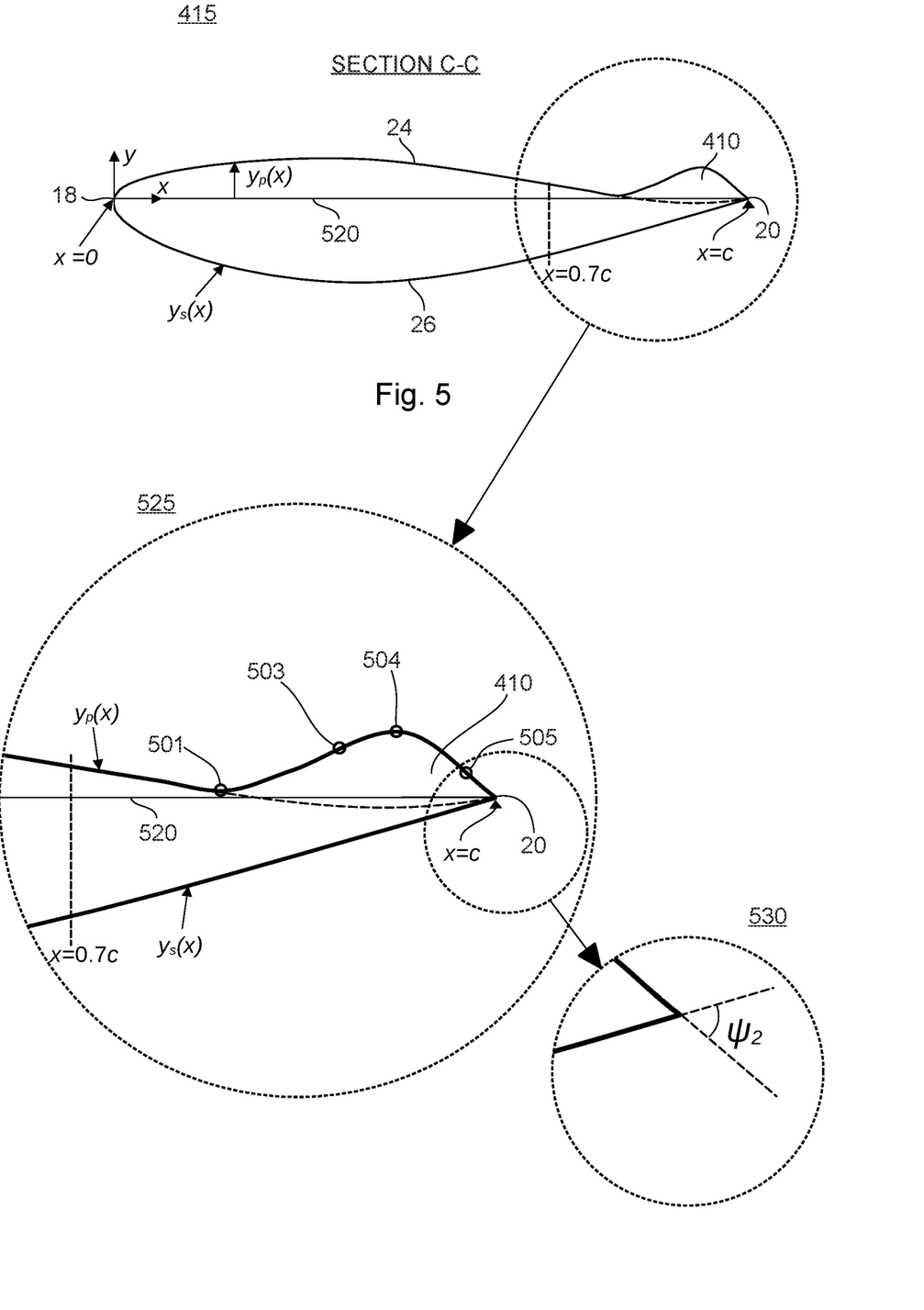
FIG. 5 is a schematic view showing an airfoil and various defining characteristics.

FIG. 5 schematically illustrates an airfoil 415 with definitions of various airfoil parameters relevant for providing vibration dampening in accordance with embodiments of the present invention. Any airfoil is characterised in part by a chord that extends from the leading edge to the trailing edge. The airfoil profile typically varies along a wind turbine blade, and the chord changes accordingly. This may include both the orientation of the chord and the length of the chord.

As is well known, the chord defines an axis x which is specific to the airfoil. The chord 520 specific to the airfoil 415 is illustrated in FIG. 5. In this description, as is normal practice, the x axis defined by any given chord has its origin x=0 at the leading edge 18 of the airfoil, and the trailing edge of the airfoil coincides with x=c, where c is the length of the chord of the airfoil.

The x axis of the airfoil defines a Cartesian y axis belonging to the airfoil. In the coordinate system defined by the airfoil chord, the pressure side 24 and suction side 26 can be parametrised as respective profile functions $y_p(x)$ and $y_s(x)$. According to the definition herein, the pressure side 24 is located over the suction side profile, i.e. $y_p(x) > y_s(x)$ except at x=0 and x=c, where the profiles collapse into the leading edge 18 and the trailing edge 20, respectively. These definitions are illustrated in FIG. 5. It is noted that the y axis has the opposite direction compared to the normal definition (pressure-side down). This is done because blades are shown in the figures pressure-side up. By flipping the y axis as compared to the normal definition, the airfoil illustrations and the blade illustrations both show the pressure-side up.

FIG. 5 illustrates a blade element 410 providing a corresponding bump located within 30% from the trailing edge, i.e. in the region x≥0.7c as indicated in FIG. 5 and the detailed view 525. According to the first aspect, this means that the airfoil fulfills the properties in item (i) above. Specifically, within 30% from the trailing edge, the slope of the pressure side profile has a slope $s_1$ followed, in a direction towards the trailing edge, by a portion with a slope $s_2$ that is higher than $s_1$, which portion is in turn followed by a portion with a slope $s_3$ that is smaller than $s_2$. In the detailed view 525, the three points 501, 503, and 504 constitute a triplet $x_1$, $x_2$, $x_3$, that meets item (i) in the first aspect of the invention. The same applies to the triplet consisting of points 501, 504, 505, and the triplet consisting of the points 503, 504, 505. This is in contrast to the prior art airfoil shown in FIG. 3B. In this airfoil, the slope of the pressure side profile steadily increases in the last 30% of the airfoil (going from a negative value to a positive value), which therefore means there is no point $x_3$ where the slope is smaller than at a prior point $x_2$. Thus, the prior art airfoil shown in FIG. 3B does not meet the limitations of the aspect.

A wind turbine blade with a bump having properties as described herein, including item (i), is less susceptible to edgewise vibrations that characterise similar wind turbine blades that do not exhibit such a bump.

A second aspect of the invention provides a wind turbine blade having a suction side and a pressure side connected at a leading edge of the wind turbine blade and at a trailing edge of the wind turbine blade, the blade extending along a longitudinal axis z from a root end of the wind turbine blade at z=0 to a tip end of the wind turbine blade at z=L, where L is a length of the blade, the blade being characterised in that:
(i) the blade comprises one or more bump airfoil sections, each bump airfoil section being characterised in that for any airfoil within the bump airfoil section, the pressure side profile $y_p(x)$ of the airfoil has an inflection point $x_i$ located in the range x=0.7c to x=0.96c,
(ii) a total length, $L_B$, of all bump airfoil sections in the blade is at most 30% of the length of the blade, and
(iii) at least half of the total length of all bump airfoil sections in the blade is provided by one or more bump airfoil sections located within the range z=0.7L to z=L.

In other words, a blade in accordance with the second aspect is characterised by items (ii) and (iii) of the first aspect, but instead of item (i) of the first aspect, the blade is characterised in that:
(i) the blade comprises one or more bump airfoil sections, each bump airfoil section being characterised in that for any airfoil within the bump airfoil section, the pressure side profile $y_p(x)$ of the airfoil has an inflection point $x_i$ located in the range x=0.8c to x=0.95c.

This characteristic provides effects similar to those of embodiments of the first aspect of the invention.

In some embodiments, the pressure side profile $y_p(x)$ of the airfoil has an inflection point $x_{ii}$ located in the range x=0.75c to x=0.98c, closer to the trailing edge than the first inflection point $x_i$.

FIG. 5 illustrates an inflection point 503 of an airfoil characterised as in item (i) of the second aspect of the invention.

A third aspect of the invention provides a wind turbine blade having a suction side and a pressure side connected at a leading edge of the wind turbine blade and at a trailing edge of the wind turbine blade, the blade extending along a longitudinal axis z from a root end of the wind turbine blade at z=0 to a tip end of the wind turbine blade at z=L, where L is a length of the blade, the blade being characterised in that:
(i) the blade comprises one or more bump airfoil sections, each bump airfoil section being characterised in that for any airfoil within the bump airfoil section, the airfoil's pressure side profile $y_p(x)$ comprises two local extremum points in the range x=0.7c to x=0.97c,
(ii) a total length, $L_B$, of all bump airfoil sections in the blade is at most 30% of the length of the blade, and
(iii) at least half of the total length of all bump airfoil sections in the blade is provided by one or more bump airfoil sections located within the range z=0.7L to z=L.

In other words, a blade in accordance with the third aspect is characterised by items (ii) and (iii) of the first aspect (and the second aspect), but instead of item (i) of the first aspect, the blade is characterised in that:
(i) the blade comprises one or more bump airfoil sections, each bump airfoil section being characterised in that for any airfoil within the bump airfoil section, the airfoil's pressure side profile $y_p(x)$ comprises a first local extremum and a second local extremum in the range x=0.7c to x=0.97c.

This characteristic provides effects similar to those of embodiments of the first aspect and the second aspect of the invention.

In some embodiments of any of the first to third aspects, a thickness of any airfoil within a bump airfoil section at x=0.95c is in the range 1.5% to 5% of the chord, such as in the range 1.5% to 3%. For instance, for an airfoil with a chord length of 1 m close to the tip, the airfoil thickness at x=0.95c is in the range 1.5 cm to 5 cm, such as 3 cm. This enhances the stabilization provided by the bump airfoil section on the blade.

In some embodiments of any of the first to third aspects, a camber line of any airfoil within a bump airfoil section has an inflection point in the range x=0.8c to x=0.9c. Usually, blade camber lines monotonically decrease towards the trailing edge, such as in the range 0.5c to c. The inventors have found that airfoils with a camber line with an inflection point in the range 0.8c to 0.9c, such as in the range 0.85c to 0.9c, provide a high change in lift, lift coefficient, and lift slope vs. angle of attack with the advantages described above, without adding excessive drag or weight.

In some embodiments, the slope of the camber line reaches half the maximum value of the slope found in the range 0.8c to 0.9c at a point after the inflection point in the direction of the trailing edge. In some embodiments, the half maximum point falls within the range x=0.9c to x=c such as within the range x=0.9c to x=0.95c. These values are representative of bumps that provide the advantages described above. As an example, the slope of the camber line may have a maximum value of 0.26 at x=0.87c and achieve the half-value of 0.13 at 0.94c.

FIG. 5 illustrates a first extremum point 501 and a second extremum point 504 of an airfoil characterised as in item (i) of the third aspect of the invention.

In some embodiments, the first extremum is located at a point $x_5$ in the range x=0.75c to x=0.85c and the second local extremum is located at a point $x_6$ in the range x=0.8c to x=0.97c, wherein the second extremum is closer to the trailing edge than half of the distance of the first extremum from the trailing edge. Extrema distributed this way provide effective vibration dampening while maintaining good drag characteristics.

In some embodiments, a distance between $x_5$ and $x_6$ is at least 0.06c, such as in the range 0.06c to 0.2c, such as in the range 0.06c to 0.15c. Extrema distributed this way provide effective vibration dampening while maintaining good drag characteristics.

As recited in the three aspects, a total length, $L_B$, of all bump airfoil sections in a wind turbine blade in accordance with the first aspect of the invention is at most 30% of the length of the blade, L. This provides significant vibration damping without adding an excessive amount of drag. In some embodiments, the total length, $L_B$, of all bump airfoil sections in the blade is at most 20% of the length of the blade. Depending on other properties of a given wind turbine blade, such as its length and shape, the bump regions may not need to extend more than 20% of the length of the blade. In some embodiments, the total length, $L_B$, of all bump airfoil sections in the blade is at most 10% of the length of the blade.

Some embodiments are characterised in that the total length of all bump airfoil sections in the blade is at most 30% of the length of the blade, and wherein at least 80% of the total length of all bump airfoil sections in the blade is located within the range z=0.7L to z=L.

Some embodiments are characterised in that the total length of all bump airfoil sections in the blade is at most 20% of the length of the blade, and wherein at least half of the total length of all bump airfoil sections in the blade is located within the range z=0.7L to z=L.

Some embodiments are characterised in that the total length of all bump airfoil sections in the blade is at most 20% of the length of the blade, and wherein at least 80% of the total length of all bump airfoil sections in the blade is located within the range z=0.7L to z=L.

Some embodiments are characterised in that the total length of all bump airfoil sections in the blade is at most 15% of the length of the blade, and wherein at least 80% of the total length of all bump airfoil sections in the blade is located within the range z=0.7L to z=L.

Some embodiments are characterised in that the total length of all bump airfoil sections in the blade is at most 10% of the length of the blade, and wherein at least 80% of the total length of all bump airfoil sections in the blade is located within the range z=0.7L to z=L.

Some embodiments are characterised in that the total length of all bump airfoil sections in the blade is at most 20% of the length of the blade, and wherein at least 80% of the total length of all bump airfoil sections in the blade is located within the range z=0.8L to z=L.

For any of the three aspects, some embodiments are characterised in that the total length of all bump airfoil sections in the blade is at most 15% of the length of the blade, and wherein at least 80% of the total length of all bump airfoil sections in the blade is located within the range z=0.8L to z=L.

In some embodiments, at least a first bump airfoil section of the one or more bump airfoil sections tapers smoothly at a first end of the first bump airfoil section into an airfoil that does not have the geometric properties recited in one of items (i) of the three aspects of the invention, such as item (i) of the first aspect. Such embodiments have the advantage that less noise is generated from the bump airfoil sections compared to embodiments without such tapering.

In addition, the first bump airfoil section may also taper smoothly at a second end of the first bump airfoil section into an airfoil that is not an airfoil of a bump airfoil section, i.e. does not exhibit the geometric properties recited in one of items (i) of the three aspects of the invention, such as item (i) of the first aspect; the second end of the first bump airfoil section is located opposite the first end of the first bump airfoil section along the longitudinal axis of the wind turbine blade. Such embodiments have the advantage that even less noise is generated from the bump airfoil sections compared to embodiments without such tapering.

It is noted that it is implicit that the first end and the second end of the first bump airfoil section are ends of the first bump airfoil section in a spanwise direction (as opposed for instance to a chordwise direction), since, as is well known, airfoils are cross-sections along the spanwise direction of a wind turbine blade.

In some embodiments, each of the one or more bump airfoil sections is tapered at its respective first and second end in the way described above.

As described above, it has been recognized that an increased enclosing angle between the pressure side and the suction side at the trailing edge can reduce the slope of the lift coefficient, which in cooperation with the features of the first aspect of the invention (and with the second and the third aspects, described below) can be used to further tailor edgewise stability characteristics of wind blades in operation.

Thus, some embodiments of any of the three aspects are further characterised in that a trailing edge enclosing angle $\psi_2$ is at least 15 degrees in at least a part of the one or more bump airfoil sections. In some embodiments, the trailing edge enclosing angle $\psi_2$ is at least 15 degrees in at least a part of the one or more bump airfoil sections. In some embodiments, the trailing edge enclosing angle $\psi_2$ is at most 45 degrees in at least a part of the one or more bump airfoil sections. In some embodiments, the trailing edge enclosing angle $\psi_2$ is in the range 15-45 degrees, such as in the range 20-42 degrees, such as in the range 25-40 degrees, in at least a part of the one or more bump airfoil sections. As described in relation to the first aspect of the invention, and this applies practically equally to the second and third aspect formulations of the specialised bump, a bump having an enclosing angle in the range 15-45 degrees, and particularly in the range 20-42 degrees, and even more particularly in the range 25-40 degrees, contributes a further enhancement of the blade efficiency.

BRIEF DESCRIPTION OF THE DRAWINGS

The invention is explained in detail below with reference to the embodiments shown in the drawings.

DETAILED DESCRIPTION OF SELECTED EMBODIMENTS

Embodiments of the invention will be described in more detail in the following with reference to the accompanying drawings. Similar reference numerals generally refer to similar elements throughout. The drawings show selected ways of implementing the aspects of the present invention and are not to be construed as limiting. Unless otherwise indicated, the drawings are not necessarily drawn to scale. The relative size of the different elements and their shape may have been chosen to make different elements or details clearly discernible.

Figure 1:
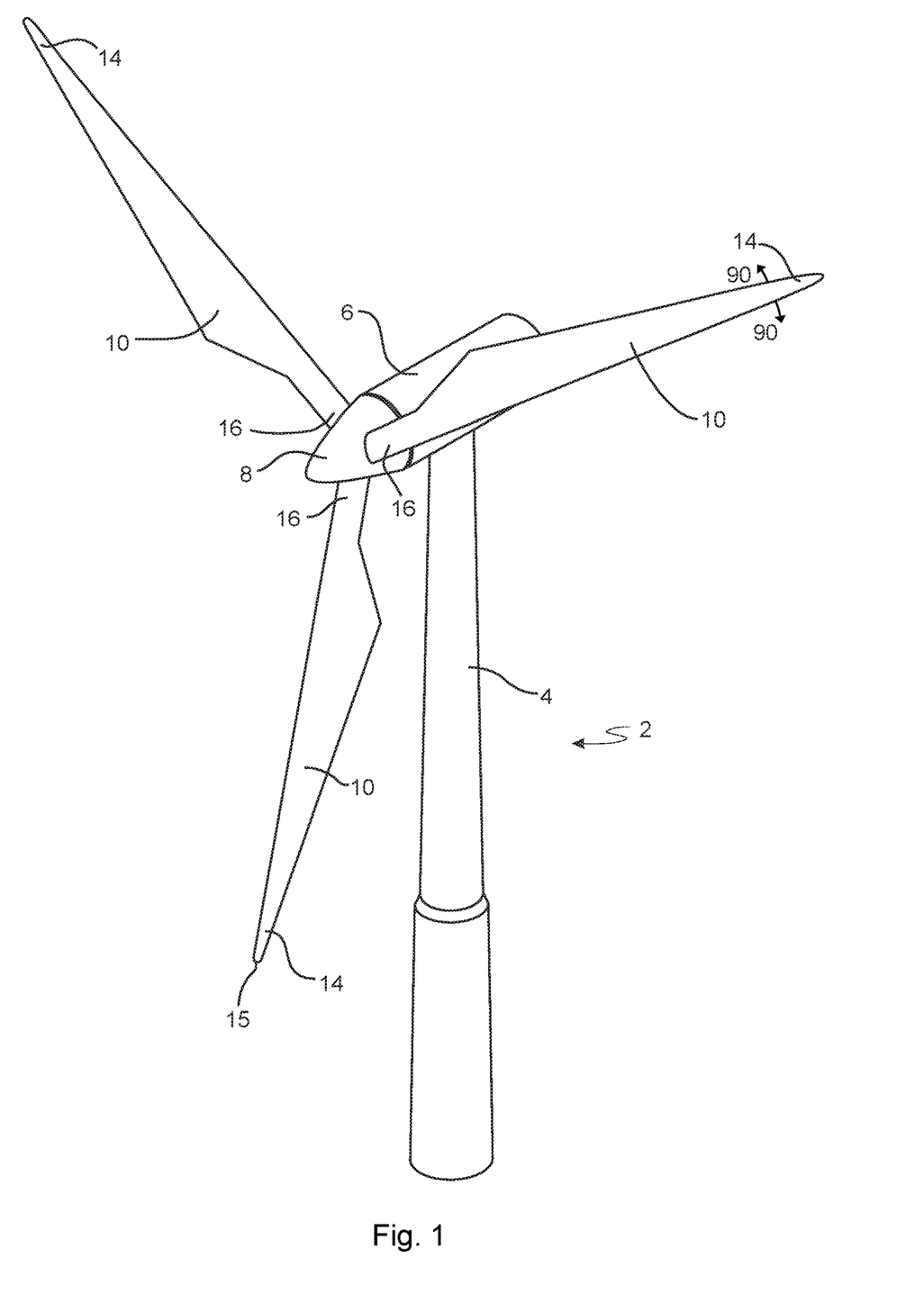
FIG. 1 is a schematic view of illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each blade having a blade root 16 nearest the hub and a blade tip 14 with a tip end 15 furthest from the hub 8. The invention is not limited to wind turbines of this type. Arrows 90 illustrates edgewise vibrations. These may occur both when the blades are in motion and during standstill.

Figure 2:
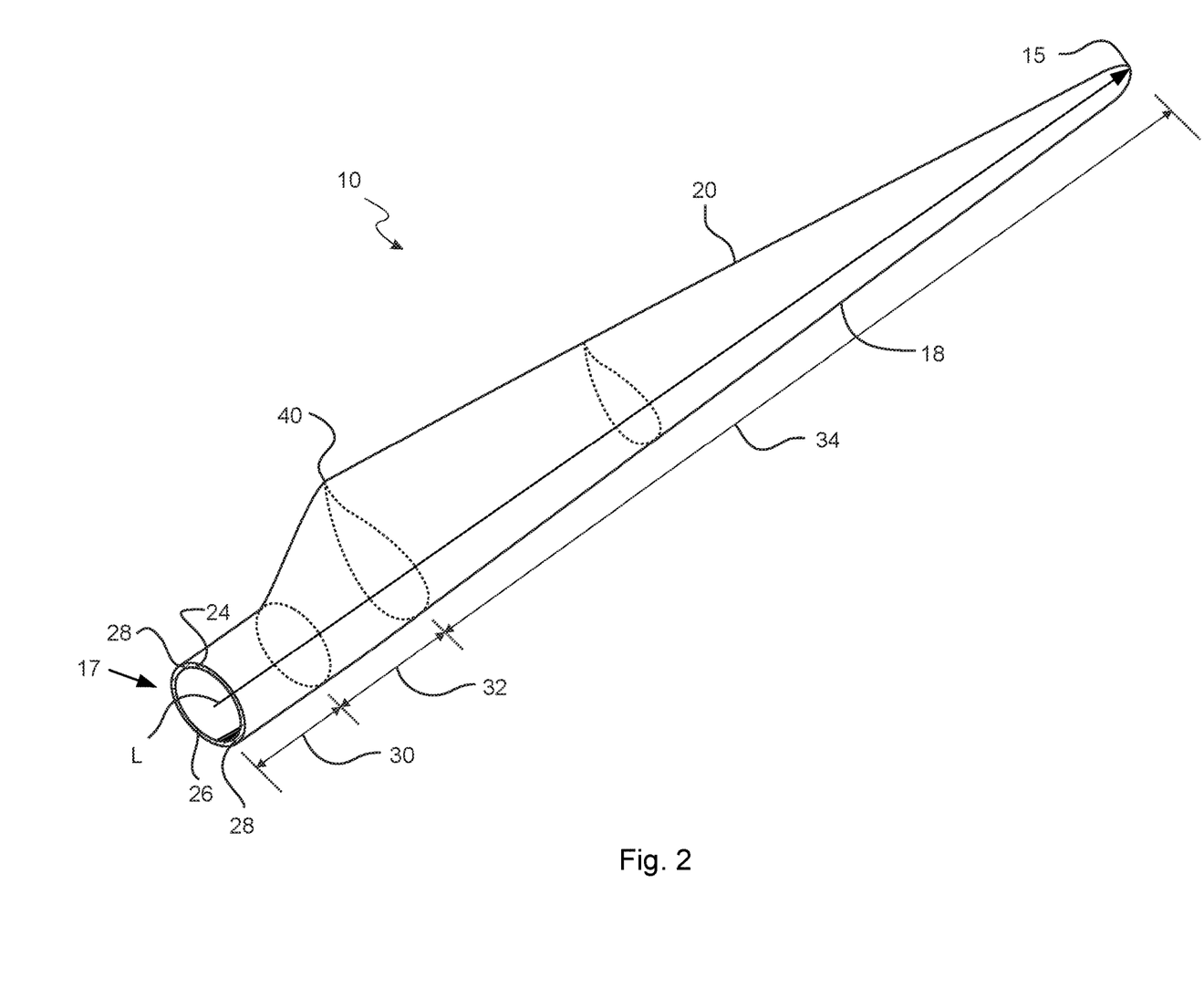
FIG. 2 is a schematic view illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or airfoil region 34, and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) preferably has an ideal shape with respect to generating hub rotation, whereas the root region 30 due to structural considerations has a substantially circular or elliptical cross-section, which for instance makes it easier and safer to mount the blade 10 to the hub. The diameter of the root region 30 may be constant along the entire root region 30. The transition region 32 present in the wind turbine blade 10 in this example has a transitional profile gradually changing from the circular shape of the root region 30 to the airfoil profile of the airfoil region 34. The chord length of the transition region 32 typically increases in an outward direction from the hub. The airfoil region 34 has an airfoil profile with a chord extending between the leading edge 18 and the trailing edge 20 of the blade 10.

Different sections of the blade normally do not have a common plane, since the blade may be twisted and/or curved (i.e. pre-bent) along a direction from the root region to the tip, this being most often the case, for instance to more or less compensate for the local velocity of the blade being dependent on the distance from the hub.

The wind turbine blade 10 comprises a blade shell which may for instance comprise two blade shell parts, a first blade shell part 24 and a second blade shell part 26, for instance made at least partly of fibre-reinforced polymer. The first blade shell part 24 may for instance be part of a pressure side or upwind blade part. The second blade shell part 26 may for instance be part of a suction side or downwind blade part. The first blade shell part 24 and the second blade shell part 26 are typically joined together, such as glued together, along bond lines or glue joints 28 extending along the trailing edge 20 and the leading edge 18 of the blade 10. Typically, the root ends of the blade shell parts 24, 26 have a semi-circular or semi-oval outer cross-sectional shape that, when the first and second shell parts are joined, forms the root region, such as a circular or oval root region.

Figure 3A:
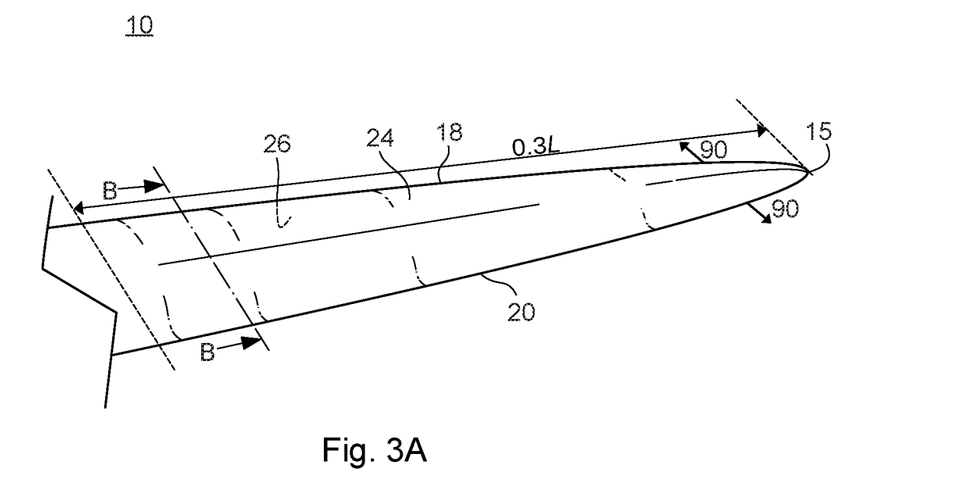
FIG. 3A is a schematic view of a tip part of a wind turbine blade in accordance with prior art.

FIG. 3A schematically illustrates the outermost part, referred to herein as "tip part", of the blade 10 shown in FIG. 2. The term "tip part" does not imply a certain relative amount of the entire blade 10, but merely indicates that it includes the tip end 15 of the blade. The other, remaining part, called "root part" herein, of the blade 10 is not shown in FIG. 3A. More particularly, FIG. 3A illustrates the outermost 30% of the blade 10, indicated as 0.3L in FIG. 3A. FIG. 3A shows the leading edge 18, the trailing edge 20, the tip end 15, and the pressure side 24, and indicates the suction side 26, which is not visible in the view in FIG. 3A where it is hidden by the pressure side 24. The tip part of the prior art blade 10 may for instance correspond to a known NACA profile or a known SERI profile. Arrows 90 illustrates edgewise vibrations, as also illustrated in FIG. 1.

Figure 3B:
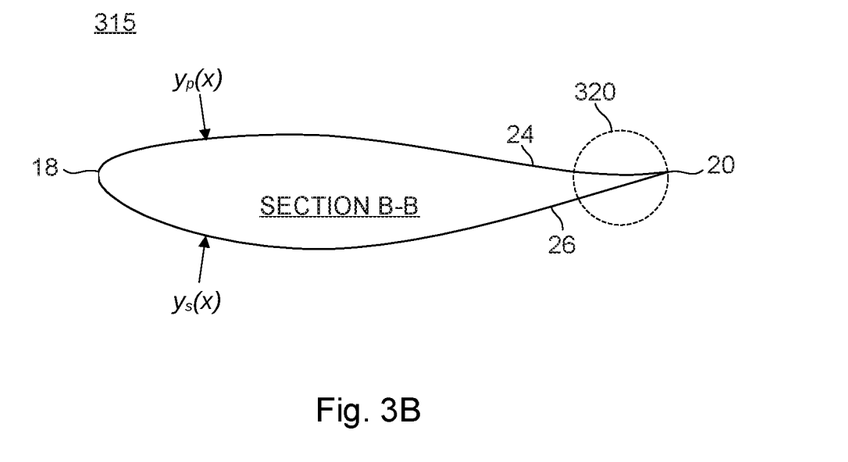
FIG. 3B is a schematic view of a particular airfoil of the tip part shown in FIG. 3A.

FIG. 3A furthermore indicates a cross-section B-B of the tip part. The airfoil 315 corresponding to cross-section B-B is shown in FIG. 3B. The leading edge 18, trailing edge 20, pressure side 24, and suction side 26 of the airfoil are indicated. As seen in the highlighted area 320, the airfoil thickness in this known airfoil decreases continuously towards the trailing edge 20. In fact, the airfoil thickness decreases in the final 60% from the leading edge 18.

Figure 4A:
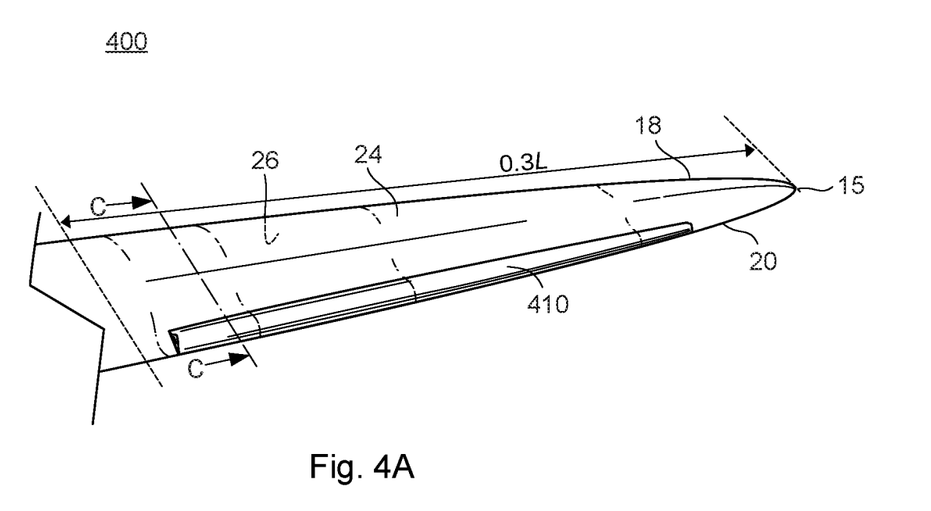
FIG. 4A is a schematic view of a tip part of a wind turbine blade in accordance with an embodiment of the invention.

FIG. 4A schematically illustrates a tip part of a wind turbine blade 400 in accordance with an embodiment of the invention. As in FIG. 3A, the root part of the blade 400 is not shown in FIG. 4A. That part may for instance be identical to a known corresponding part, such as the root part of the blade 10 shown in FIG. 2, or it may be different.

Figure 4B:
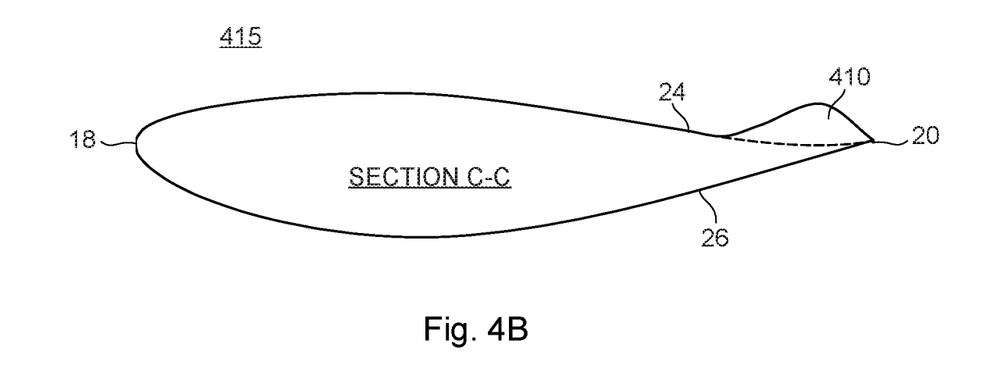
FIG. 4B is a schematic view of a particular airfoil of the tip part shown in FIG. 4A.

As in FIG. 3A, FIG. 4A illustrates the outermost 30% of the blade, indicated as 0.3L in FIG. 4A. FIG. 4A also shows the leading edge 18, the trailing edge 20, the tip end 15, and the pressure side 24. FIG. 4A also indicates the suction side 26, which is not visible in the view in FIG. 4A where it is hidden by the pressure side 24. The tip part of the blade 400 differs from the tip part of blade 10 shown in FIG. 3A by the blade element 410 near the trailing edge 20 of the blade 400. In the present example, the tip part of the blade 400 is shown as a modification, or retrofit, of the blade 10, but it may alternatively be formed as an integrated part of the wind turbine blade when manufactured. The blade element 410 modifies the airfoil along the entire corresponding section, turning the corresponding section of the blade into a bump airfoil section. An example of an airfoil 415 located in the bump airfoil section is shown in FIG. 4B, which shows the airfoil corresponding to the cross-section C-C indicated in FIG. 4A. As shown in FIG. 4B, the addition of the blade element 410 results in a bump near the trailing edge 20. The dashed line in FIG. 4B illustrates the corresponding airfoil of the prior art blade 10 at the same longitudinal position as shown in FIGS. 3A and 3B.

The airfoil 415 is characterised in part as follows: At $x_1=0.75c$, the pressure side profile slope, $s_1$, is $-0.10$; at $x_2=0.82c$, the pressure side profile slope, $s_2$, is $0.21$; and at $x_3=0.97c$, the pressure side profile slope, $s_3$, is $-0.48$ (the points are not indicated in the drawings). These values fulfil the properties recited in item (i) of the first aspect of the invention, which means that cross-section C-C (shown in FIG. 4A) is an airfoil of a bump airfoil section in accordance with item (i) of the first aspect of the invention. Although both the blade's cross-section and the blade element 410 change in both shape and size along the longitudinal axis of the blade, all cross-sections, i.e. airfoils, within the region comprising the blade element 410 have the geometric properties recited in item (i) of the first aspect of the invention. Thus, the entire section containing the blade element 410 is a bump airfoil section in the sense of the first aspect of the invention. All values are approximate.

In line with item (ii) of the first aspect of the invention, the bump airfoil section in FIG. 4A has a length of at most 30% of the entire length of the blade. The bump airfoil section in FIG. 4A has a length which is approximately 23% of the entire length of the blade 400.

In line with item (iii) of the first aspect of the invention, the bump airfoil section, i.e. the section comprising the blade element 410, is located in the range $z=0.7L$ to $z=L$, i.e. within the outer 30% of the blade. The shape and location of the bump airfoil section cooperate to provide dampening of edgewise vibrations without adding excessive weight and drag.

The modified blade 400 shown in FIG. 4B is much less susceptible to the vibrations 90 shown in FIG. 3A for the prior art blade 10.

It is seen from the properties above that the tip part 400 shown in FIG. 4A belongs to an embodiment of the first aspect of the invention (the root part is not shown).

In addition, the tip part 400 shown in FIG. 4A has all the characteristics of the second aspect of the invention. Items (ii) and (iii) are the same as in the first aspect of the invention and are therefore met as described above. The pressure side profile $y_p(x)$ of the airfoil 415 has an inflection point at $x_i=0.86c$ and therefore has the geometric properties of item (i) of the second aspect of the invention, which requires that the pressure side profile $y_p(x)$ of the airfoil has an inflection point in the range $x=0.7c$ to $x=0.96c$. Although both the blade's cross-section and the blade element 410 change in both shape and size along the longitudinal axis of the blade, all cross-sections, i.e. airfoils, within the region comprising the blade element 410 have the geometric properties recited in item (i) of the second aspect of the invention. Thus, the entire section containing the blade element 410 is a bump airfoil section in the sense of the second aspect of the invention.

It is thus seen from the properties above that the tip part 400 shown in FIG. 4A belongs to an embodiment of the second aspect of the invention.

In addition, the tip part 400 shown in FIG. 4A has all the characteristics of the third aspect of the invention. Items (ii) and (iii) are the same as in the first aspect of the invention and are therefore met as described above. The pressure side profile $y_p(x)$ of the airfoil 415 in FIG. 4B has a first local extremum (a local minimum) at $x=0.80c$ with a value of $0.005c$ and a second local extremum (a local maximum) at $x=0.925c$ with a value of $0.046c$. All values are approximate. Although both the blade's cross-section and the blade element 410 change in both shape and size along the longitudinal axis of the blade, all cross-sections, i.e. airfoils, within the region comprising the blade element 410 have the geometric properties recited in item (i) of the third aspect of the invention. Thus, the entire section containing the blade element 410 is a bump airfoil section in the sense of the third aspect of the invention.

It is thus seen from the properties above that the tip part 400 shown in FIG. 4A belongs to an embodiment of the third aspect of the invention.

On the other hand, the prior art airfoil shown in FIG. 3B does not have the geometric properties recited in item (i) of any of the three aspects of the invention, let alone items (ii) and (iii).

A wind turbine blade having the tip part shown in FIG. 4A produces less edgewise vibrations, increasing fatigue characteristics, while retaining acceptable noise characteristics. Furthermore, the slope of the lift coefficient for the blade in FIG. 4A is less steep compared to the blade 10 in FIG. 3A, being the main driver for the desired change in aeroelastic characteristics and the resulting avoidance of instabilities and resulting vibrations respectively oscillations.

FIG. 5, detail 530, also illustrates the enclosing angle $\psi_2$ of the trailing edge 20. An increase in the enclosing angle between the pressure side and the suction side at the trailing edge can reduce the slope of the lift coefficient, which in cooperation with the features of the first aspect of the invention (and with the second and the third aspects) can be used to tailor stability characteristics of wind blades in operation. The enclosing angle in the airfoil in FIGS. 4B and 5 is approximately 48 degrees. (Note that the axes in for instance FIGS. 4B and 5 are arbitrary, and the figures therefore do not readily reflect the correct enclosing angle.)

Figure 6A:
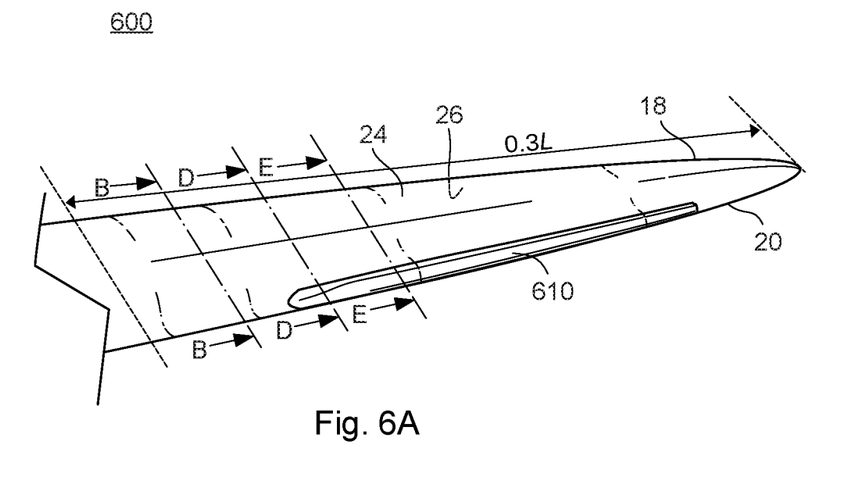
FIG. 6A is a schematic view of a tip part of a wind turbine blade in accordance with an embodiment of the invention.

FIG. 6A shows the tip part of another wind turbine blade in accordance with an embodiment of the invention. A blade element 610 providing a bump is located within 30% from the trailing edge, i.e. in the region $x \geq 0.7c$. In this embodiment, the bump is tapered towards the root end of the wind turbine blade, into an airfoil that does not have the geometric properties recited in item (i). This may for instance be a taper into the airfoil at cross-section B-B, which in the present example is identical to airfoil 315 shown in FIG. 3B. Such tapering strongly reduces the noise impact of the blade element 610. The other end of the blade element 610 is not illustrated as being tapered. To further reduce noise, this end may be tapered as well. As in FIG. 4A, the bump in FIG. 6A is illustrated as an add-on to an existing blade, such as blade 10 shown in FIG. 3A.

In addition to being situated with 30% of the airfoil from the trailing edge, the bump is arranged in the outermost 30% of the blade, similar to the blade element 410 illustrated in FIG. 4A. This is where the bump airfoil section can effectively suppress edgewise vibrations. The length of the bump airfoil section created by the blade element 610 is approximately 18% of the length of the blade.

It is noted that the bumps shown in the figures illustrate various embodiments of the invention and must not be construed as representing optimal solutions for the blades shown in the figures.

Figure 6B:
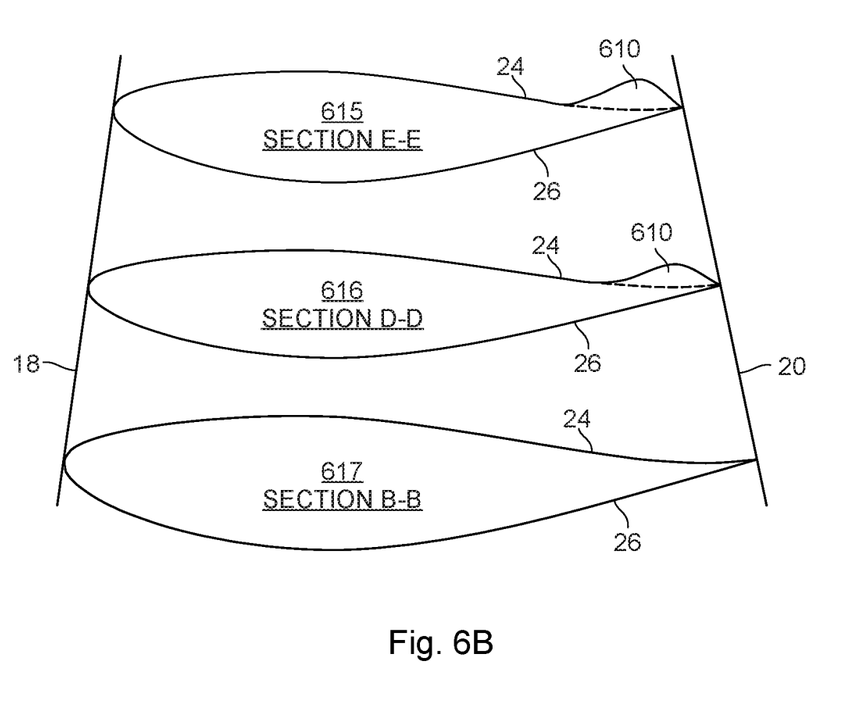
FIG. 6B is a schematic view of three particular airfoils along the tip part shown in FIG. 6A.

FIG. 6B shows the airfoils 617, 616, 615 corresponding, respectively, to cross-sections B-B, D-D, and E-E indicated in FIG. 6A. The cross-section B-B is identical to that indicated in FIG. 3A, which shows the tip part of a prior art blade. Thus, as in FIG. 3A, the corresponding airfoil 617 does not have the geometric properties recited in items (i) of any of the aspects of the present invention and therefore is not an airfoil of a bump airfoil section. On the other hand, the airfoil 616 at cross-section D-D meets the features in item (i) of the first aspect of the invention (as well as the second and third aspects). In other words, at cross-section D-D, the bump has the property of a bump airfoil section in the sense of item (i). As such, it contributes to effectively suppress vibrations in the tip part.

Furthermore, the airfoil 615 at cross-section E-E also has the geometric properties recited in item (i) of the first aspect of the invention (as well as the second and third aspects). Similar to the bump at cross-section D-D, the bump at cross-section E-E has the property of a bump airfoil section in the sense of item (i). Like the bump created by blade element 610 at cross-section D-D, the bump at cross-section E-E therefore also contributes to suppress vibrations in the tip part.

The airfoils 615, 616, 617 in FIG. 6B also illustrate that the blade element 610 results in a smoothly tapered bump airfoil section. Starting for instance from airfoil 615, corresponding to cross-section E-E, airfoil 616, corresponding to cross-section D-D, has a less pronounced bump, and finally at cross-section 617, corresponding to cross-section B-B, there is no longer a bump—the airfoil 617 does not have the geometric properties recited in item (i).

Figure 7:
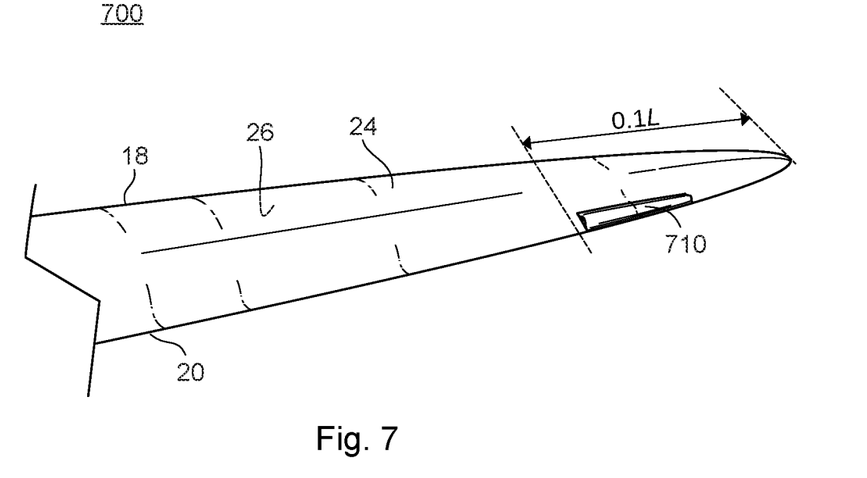
FIGS. 7-9 are schematic views of tip parts of wind turbine blades in accordance with various embodiments of the invention.

FIG. 7 shows the tip part 700 of another wind turbine blade in accordance with an embodiment of the invention. A blade element 710 providing a bump is located within 30% from the trailing edge, i.e. in the region $x \geq 0.7c$. In this embodiment, the blade element 710 is tapered towards the tip. Although not shown separately, all airfoils along the blade element 710 all have the geometric properties recited in item (i), and the blade section containing the blade element 710 is therefore a bump airfoil section and provides suppression of edgewise vibrations.

In the embodiment in FIG. 7, the blade element is arranged in the outermost 10% of the blade. In some cases, this may be enough to sufficiently suppress edgewise directions. The shorter bump means less added weight compared to a similar blade without a bump airfoil section. However, bump airfoil sections must have a total length that sufficiently suppresses edgewise vibrations in a blade. This depends on the properties such as the geometry of the blade, its lengths, and its weight. It is noted that for a given blade, edgewise vibrations may be (and often is) a problem only in certain operating conditions. Thus, what constitutes sufficient suppression depends on a number of factors, including not only the blade's properties, but also factors such as the local wind conditions at the site at which the blade is in operation.

Figure 8:
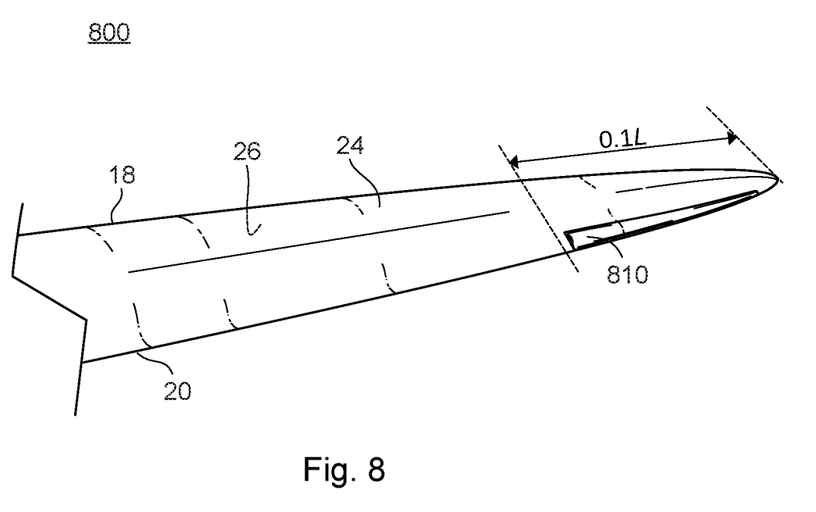

FIG. 8 shows the tip part 800 of another wind turbine blade in accordance with an embodiment of the invention, quite similar to the embodiment in FIG. 7.

A blade element 810 providing a bump is located within 30% from the trailing edge, i.e. in the region $x \geq 0.7c$. Although not shown separately, all airfoils along the blade element 810 all have the geometric properties recited in item (i), and the blade section containing the blade element 810 is therefore a bump airfoil section and provides suppression of edgewise vibrations. Furthermore, the blade element 810 in this example is tapered towards the tip end of the blade. This reduces the amount of noise generated by the bump airfoil section.

Figure 9:
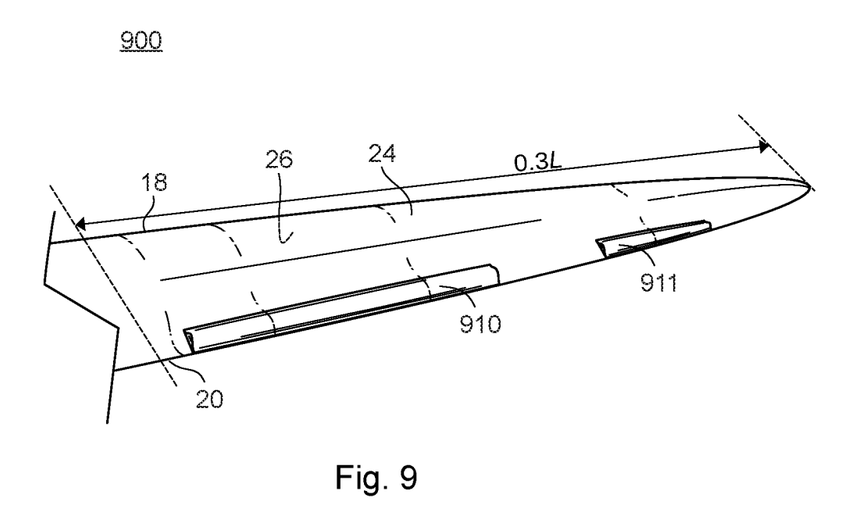

FIG. 9 illustrates a tip part 900 of another wind turbine blade in accordance with an embodiment of the invention. The embodiment is quite similar to the embodiment in FIG. 4A. However, the embodiment in FIG. 9 contains two separate bump airfoil sections by virtue of blade elements 910 and 911. The blade section between the two blade elements 910 and 911 does not have airfoils with the geometric properties in item (i) of any of the three aspects.

Various ways of carrying out the invention, in addition to those described above and in the claims, are defined by the following items:

1. A wind turbine blade having a suction side and a pressure side connected at a leading edge of the wind turbine blade and at a trailing edge of the wind turbine blade, the blade extending along a longitudinal axis z from a root end of the wind turbine blade at $z=0$ to a tip end of the wind turbine blade at $z=L$, where L is a length of the blade, the blade being characterised in that:
   (i) the blade comprises one or more bump airfoil sections, each bump airfoil section being characterised in that for any airfoil within the bump airfoil section, the airfoil's pressure side profile $y_p(x)$ has the following geometric properties near the trailing edge of the airfoil, x being an axis defined by a chord of the airfoil, where the chord has a length c and $x=0$ coincides with a leading edge of the airfoil and $x_c=c$ coincides with a trailing edge of the airfoil:
   at a point $x=x_1$, where $x_1 \geq 0.6c$, the pressure side profile $y_p(x)$ has a slope $s_1$ and $y_p(x_1) > y_s(x_1)$, where $y_s(x)$ is a suction side profile of the airfoil,
   there is a point $x=x_2$, $x_2 > x_1$, where a slope $s_2$ of the pressure side profile $y_p(x)$ is higher than the slope $s_1$ at $x=x_1$,
   there is a point $x=x_3$, $x_3 > x_2$, where a slope $s_3$ of the pressure side profile $y_p(x)$ is lower than the slope $s_2$ at $x=x_2$,
   (ii) a total length, $L_B$, of all bump airfoil sections in the blade is at most 30% of the length of the blade, L, and
   (iii) at least half of the total length of all bump airfoil sections in the blade is located within the range $z=0.7L$ to $z=L$.

2. A wind turbine blade in accordance with item 1, wherein $x_3$ fulfills $x_3 \leq 0.97c$ in at least a part of the one or more bump airfoil sections.

3. A wind turbine blade in accordance with any of items 1-2, wherein $x_1$ fulfills $x_1 \geq 0.8c$ in at least a part of the one or more bump airfoil sections.

4. A wind turbine blade in accordance with any of items 1-2, wherein $x_1$ fulfills $x_1 \geq 0.7c$ in at least a part of the one or more bump airfoil sections, and $x_2$ fulfills $x_2 > 0.8c$ in at least a part of the one or more bump airfoil sections.

5. A wind turbine blade in accordance with any of the preceding items, there is a point $x_2$ where $s_2$ fulfills $s_2>-0.05$ in at least a part of the one or more bump airfoil sections.
6. A wind turbine blade in accordance with any of the preceding items, there is a point $x_2$ where $s_2$ fulfills $s_2>0.2$ in at least a part of the one or more bump airfoil sections.
7. A wind turbine blade in accordance with any of the preceding items, there is a point $x_3$ where $s_3$ fulfills $s_3<-0.05$, such as $s_3<-0.3$, in at least a part of the one or more bump airfoil sections.
8. A wind turbine blade in accordance with any of items 1-7, wherein within the range $x>0.7c$ to $x=c$:
   a highest slope of the pressure side profile $y_p(x)$ is in the range $-0.05$ to $0.5$, and
   a lowest slope of the pressure side profile $y_p(x)$ is in the range $-0.5$ to $0.1$.
9. A wind turbine blade in accordance with item 8, wherein within the range $x>0.7c$ to $x=c$:
   a highest slope of the pressure side profile $y_p(x)$ is in the range $0.18$ to $0.31$, and
   a lowest slope of the pressure side profile $y_p(x)$ is in the range $-0.39$ to $-0.26$.
10. A wind turbine blade in accordance with any of items 1-9, wherein the total length of all bump airfoil sections in the blade is at most 30% of the length of the blade, and wherein at least 80% of the total length of all bump airfoil sections in the blade is located within the range $z=0.7L$ to $z=L$.
11. A wind turbine blade in accordance with any of items 1-10, wherein at least a first bump airfoil section of the one or more bump airfoil sections tapers smoothly at a first end of the first bump airfoil section into an airfoil that does not have the geometric properties recited in item (i).
12. A wind turbine blade in accordance with item 11, wherein the first bump airfoil section tapers smoothly at a second end of the first bump airfoil section opposite the first end of the first bump airfoil section into an airfoil that does not have the geometric properties recited in item (i).
13. A wind turbine blade in accordance with any of the preceding items, wherein a trailing edge enclosing angle $\psi_2$ is in the range 15-45 degrees in at least a part of the one or more bump airfoil sections.
14. A wind turbine blade in accordance with any of the preceding items, wherein a trailing edge enclosing angle $\psi_2$ is in the range 20-42 degrees in at least a part of the one or more bump airfoil sections.
15. A wind turbine blade in accordance with any of the preceding items, wherein at least a part of the one or more bump airfoil sections is obtained by adding a separate element to a wind turbine blade.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
90 edgewise vibrations
300 tip part of blade
315 airfoil
320 trailing edge detail
400 tip part of blade
410 trailing edge bump
415 airfoil
501 pressure side profile point; bump minimum
503 pressure side profile point; bump inflection point
504 pressure side profile point; bump maximum
505 pressure side profile point
520 chord
525 trailing edge bump detail
530 enclosing angle detail
600 tip part of blade
610 blade element providing a bump
615, 616, 617 airfoil
700 tip part of blade
710 blade element providing a bump
800 tip part of blade
810 blade element providing a bump
910, 911 blade element providing a bump
c chord length
L longitudinal axis of blade
$\psi_2$ enclosing angle of trailing edge
x coordinate axis defined by an airfoil chord
y Cartesian coordinate axis corresponding to an x axis defined by an airfoil chord
$y_p(x)$ pressure side profile
$y_s(x)$ suction side profile

The invention claimed is:
1. A wind turbine blade having a suction side and a pressure side connected at a leading edge of the wind turbine blade and at a trailing edge of the wind turbine blade, the blade extending along a longitudinal axis z from a root end of the wind turbine blade at $z=0$ to a tip end of the wind turbine blade at $z=L$, where L is a length of the wind turbine blade, the wind turbine blade being characterised in that:
   (i) the wind turbine blade comprises one or more bump airfoil sections, each of the one or more bump airfoil sections being characterised in that for any airfoil within the bump airfoil section, a pressure side profile $y_p(x)$ of the airfoil has the following geometric properties near a trailing edge of the airfoil, x being an axis defined by a chord of the airfoil, where the chord has a length c and $x=0$ coincides with a leading edge of the airfoil and $x_c=c$ coincides with the trailing edge of the airfoil:
      at a point $x=x_1$, where $x_1 \geq 0.6c$, the pressure side profile $y_p(x)$ has a slope $s_1$ and $y_p(x_1) > y_s(x_1)$, where $y_s(x)$ is a suction side profile of the airfoil,
      there is a point $x=x_2$, $x_2>x_1$, where a slope $s_2$ of the pressure side profile $y_p(x)$ is higher than the slope $s_1$ at $x=x_1$,
      there is a point $x=x_3$, $x_3>x_2$, where a slope $s_3$ of the pressure side profile $y_p(x)$ is lower than the slope $s_2$ at $x=x_2$, and
   wherein within a range of $x>0.7c$ to $x=c$:
      a highest slope of the pressure side profile $y_p(x)$ is in the range $-0.05$ to $0.5$, and a lowest slope of the pressure side profile $y_p(x)$ is in the range −0.5 to 0.1, (ii) a total length, $L_B$, of all of the one or more bump airfoil sections in the wind turbine blade is at most 30% of the length of the wind turbine blade, L, and (iii) at least half of the total length of all of the one or more bump airfoil sections in the wind turbine blade is located within a range of z=0.7L to z=L.

2. The wind turbine blade in accordance with claim 1, wherein $x_3$ fulfils $x_3 \leq 0.97c$ in at least a part of the one or more bump airfoil sections.

3. The wind turbine blade in accordance with claim 1, wherein $x_1$ fulfils $x_1 \geq 0.8c$ in at least a part of the one or more bump airfoil sections.

4. The wind turbine blade in accordance with claim 1, wherein $x_1$ fulfils $x_1 \geq 0.7c$ in at least a part of the one or more bump airfoil sections, and $x_2$ fulfils $x_2 > 0.8c$ in at least a part of the one or more bump airfoil sections.

5. The wind turbine blade in accordance with claim 1, wherein, for the point $x_2$, $s_2$ fulfils $s_2 > -0.05$ in at least a part of the one or more bump airfoil sections.

6. The wind turbine blade in accordance with claim 1, wherein, for the point $x_2$, $s_2$ fulfils $s_2 > 0.2$ in at least a part of the one or more bump airfoil sections.

7. The wind turbine blade in accordance with claim 1, wherein, for the point $x_3$, $s_3$ fulfils $s_3 < -0.05$ in at least a part of the one or more bump airfoil sections.

8. The wind turbine blade in accordance with claim 1, wherein within a range of $x > 0.7c$ to $x=c$:

a highest slope of the pressure side profile $y_p(x)$ is in the range 0.18 to 0.31, and a lowest slope of the pressure side profile $y_p(x)$ is in the range −0.39 to −0.26.

9. The wind turbine blade in accordance with claim 1, wherein a thickness of any airfoil within the one or more bump airfoil sections at $x=0.95c$ is in a range of 1.5% to 5% of the chord length c.

10. The wind turbine blade in accordance with claim 1, wherein a camber line of any airfoil within the one or more bump airfoil sections has an inflection point within a range of $x=0.8c$ to $x=0.9c$.

11. The wind turbine blade in accordance with claim 10, wherein a slope of the camber line reaches half of a maximum value of the slope found in a range of 0.8c to 0.9c at a point after the inflection point in a direction of the trailing edge.

12. The wind turbine blade in accordance with claim 1, wherein the total length of all of the one or more bump airfoil sections in the wind turbine blade is at most 30% of the length of the blade, and wherein at least 80% of the total length of all of the one or more bump airfoil sections in the wind turbine blade is located within a range of z=0.7L to z=L.

13. The wind turbine blade in accordance with claim 1, wherein at least a first bump airfoil section of the one or more bump airfoil sections tapers smoothly at a first end of the first bump airfoil section into an airfoil that does not satisfy the following conditions:

at a point $x=x_1$, where $x_1 \geq 0.6c$, the pressure side profile $y_p(x)$ has a slope $s_1$ and $y_p(x_1) > y_s(x_1)$, where $y_s(x)$ is a suction side profile of the airfoil, there is a point $x=x_2$, $x_2 > x_1$, where a slope $s_2$ of the pressure side profile $y_p(x)$ is higher than the slope $s_1$ at $x=x_1$, and there is a point $x=x_3$, $x_3 > x_2$, where a slope $s_3$ of the pressure side profile $y_p(x)$ is lower than the slope $s_2$ at $x=x_2$.

14. The wind turbine blade in accordance with claim 13, wherein the first bump airfoil section tapers smoothly at a second end of the first bump airfoil section opposite the first end of the first bump airfoil section into an airfoil that does not satisfy the following conditions:

at a point $x=x_1$, where $x_1 \geq 0.6c$, the pressure side profile $y_p(x)$ has a slope $s_1$ and $y_p(x_1) > y_s(x_1)$, where $y_s(x)$ is a suction side profile of the airfoil, there is a point $x=x_2$, $x_2 > x_1$, where a slope $s_2$ of the pressure side profile $y_p(x)$ is higher than the slope $s_1$ at $x=x_1$, and there is a point $x=x_3$, $x_3 > x_2$, where a slope $s_3$ of the pressure side profile $y_p(x)$ is lower than the slope $s_2$ at $x=x_2$.

15. The wind turbine blade in accordance with claim 1, wherein a trailing edge enclosing angle $\psi_2$ is in a range of 15-45 degrees in at least a part of the one or more bump airfoil sections.

16. The wind turbine blade in accordance with claim 1, wherein a trailing edge enclosing angle $\psi_2$ is in a range of 20-42 degrees in at least a part of the one or more bump airfoil sections.

17. The wind turbine blade in accordance with claim 1, wherein a trailing edge enclosing angle $\psi_2$ is in a range of 25-40 degrees in at least a part of the one or more bump airfoil sections.

18. The wind turbine blade in accordance with claim 1, wherein at least a part of the one or more bump airfoil sections is obtained by adding a separate element to the wind turbine blade.

* * * * *